United States Patent
Jia et al.

(10) Patent No.: US 11,917,579 B2
(45) Date of Patent: Feb. 27, 2024

(54) DOWNLINK DATA TRANSMISSION METHOD AND APPARATUS AND COMMUNICATION SYSTEM

(71) Applicant: FUJITSU LIMITED, Kawasaki (JP)

(72) Inventors: Meiyi Jia, Beijing (CN); Lianhai Wu, Beijing (CN); Yulong Shi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/299,711

(22) Filed: Mar. 12, 2019

(65) Prior Publication Data

US 2019/0208500 A1    Jul. 4, 2019

Related U.S. Application Data

(63) Continuation of application No. PCT/CN2016/099568, filed on Sep. 21, 2016.

(51) Int. Cl.
*H04W 68/02*    (2009.01)
*H04W 72/23*    (2023.01)
(Continued)

(52) U.S. Cl.
CPC ........... *H04W 68/02* (2013.01); *H04W 72/23* (2023.01); *H04W 36/0033* (2013.01)

(58) Field of Classification Search
CPC .......................... H04W 68/02; H04W 72/1289
See application file for complete search history.

(56) References Cited

U.S. PATENT DOCUMENTS

| 2014/0038622 A1* | 2/2014 | Zhu ................. | H04W 72/02 455/450 |
| 2015/0173121 A1* | 6/2015 | Miklos ............... | H04W 68/00 370/329 |

(Continued)

FOREIGN PATENT DOCUMENTS

| CN | 101489270 A | 7/2009 |
| CN | 101521919 A | 9/2009 |

(Continued)

OTHER PUBLICATIONS

International Search Report issued by State Intellectual Property Office of the P.R. China for corresponding International Patent Application No. PCT/CN2016/099568, dated Jun. 20, 2017, with an English translation.

(Continued)

*Primary Examiner* — Muthuswamy G Manoharan
(74) *Attorney, Agent, or Firm* — Myers Wolin, LLC (57) ABSTRACT

A downlink data transmission method and apparatus and a communication system. The method includes: an anchor eNB determines a non-anchor eNB which is required to schedule downlink data of an UE according to a paging area information of the UE when the downlink data of the UE arrives; and the anchor eNB transmits a paging message to the non-anchor eNB, the paging message including a context of the UE and a data packet of the downlink data, so that the non-anchor eNB schedules the downlink data of UE according to the context of the UE. With the embodiments of this disclosure, a time for state transition from an idle state to a connected state for the UE is shortened, and control plane delay is reduced.

14 Claims, 5 Drawing Sheets

(51) Int. Cl.
*H04W 36/00* (2009.01)
*H04W 72/12* (2023.01)

(56) References Cited

U.S. PATENT DOCUMENTS

| | | |
|---|---|---|
| 2015/0264580 A1 | 9/2015 | Iwai et al. |
| 2016/0212728 A1 | 7/2016 | Chang et al. |
| 2016/0374048 A1* | 12/2016 | Griot ................. H04W 12/0017 |
| 2017/0374585 A1* | 12/2017 | Pradas ................ H04W 36/023 |
| 2017/0374612 A1* | 12/2017 | Stojanovski .......... H04W 60/04 |
| 2018/0084466 A1* | 3/2018 | Zeller ............. H04W 36/00837 |
| 2019/0014512 A1* | 1/2019 | Rune ................. H04W 36/0016 |
| 2019/0082418 A1* | 3/2019 | Zee ..................... H04W 68/025 |

FOREIGN PATENT DOCUMENTS

| | | |
|---|---|---|
| CN | 101998670 A | 3/2011 |
| CN | 105493589 A | 4/2016 |
| WO | 2007/093101 A1 | 8/2007 |
| WO | 2010/133172 A1 | 11/2010 |
| WO | WO-2017166271 A1 * | 10/2017 ............... B61L 1/20 |
| WO | WO-2018036455 A1 * | 3/2018 |

OTHER PUBLICATIONS

Written Opinion of the International Searching Authority issued by State Intellectual Property Office of the P.R. China for corresponding International Patent Application No. PCT/CN2016/099568, dated Jun. 20, 2017, with an English translation.
First Notification of Office Action and Search Report issued by the China National Intellectual Property Administration for corresponding Chinese Patent Application No. 201680088591.X, dated Oct. 12, 2020, with an English ranslation.
First Notification of Office Action and Search Report issued by the China National Intellectual Property Administration for corresponding Chinese Patent Application No. 202110777680.8, dated Dec. 1, 2023, with an English translation.
Huawei, "Context fetch in light connection", Agenda Item: 21, 3GPP TSG-RAN3 Meeting #93, R3-161721, Gothenburg, Sweden, Aug. 22-26, 2016.

* cited by examiner

201 the anchor eNB determines a non-anchor eNB needing to schedule downlink data of UE according to paging region information of the UE when the downlink data of the UE arrive

202 the anchor eNB transmits a paging message to the non-anchor eNB, the paging message including a context of the UE and a data packet of the downlink data

DOWNLINK DATA TRANSMISSION METHOD AND APPARATUS AND COMMUNICATION SYSTEM

CROSS REFERENCE TO RELATED APPLICATIONS

This application is a continuation application of International Application PCT/CN2016/099568 filed on Sep. 21, 2016, the entire contents of which are incorporated herein by reference.

FIELD

This disclosure relates to the field of communication technologies, and in particular to a downlink data transmission method and apparatus and a communication system.

BACKGROUND

In a current new radio (NR) system, introducing "a RAN (radio access network) controlled state" is being discussed. The state is used for a user terminal (UE, User Equipment, also referred to as a user, a terminal, and a station, etc.) with low activity, which should at least meet control plane delay requirements of a new technique and achieve energy consumption equivalent to that in an idle state in a long term evolution (LTE) system.

For the UE in the "RAN controlled state", a connection between the RAN and a core network, including the control plane and the user plane, should be maintained; and an RAN-initiated notification procedure is used to achieve downlink reachability of the UE. The RAN should be informed when the UE moves from an "RAN-based notification area" to another.

In addition, a UE with light connection is currently being studied in the LTE, which is, reducing signaling overhead for a small data transmission. The UE with light connection should have the following functions that:

An S1 connection between "an anchor eNB" and a core network (a communication interface) is maintained and activated;

RAN-initiated paging is supported, which is controlled by "the anchor eNB";

a RAN based paging area controlled by an eNB is supported; the paging area can be configured as a UE-specific area, which is configured as one or more cells from RAN2 (an organization in the 3rd Generation Partnership Project (3GPP) studying high-layer protocols over wireless interface) point of view where the cells can belong to different eNBs;

a RAN-based paging area update mechanism is supported; when the UE moves out of the configured RAN-based paging area, the network needs to be informed;

when the UE a light connection is paged in an RAN-initiated paging procedure, or when a mobile originated (MO) data/signaling is triggered, the UE will connects to the eNB;

both the UE side and the "anchor eNB" side keep a UE access stratum (AS) context.

Figure 1:
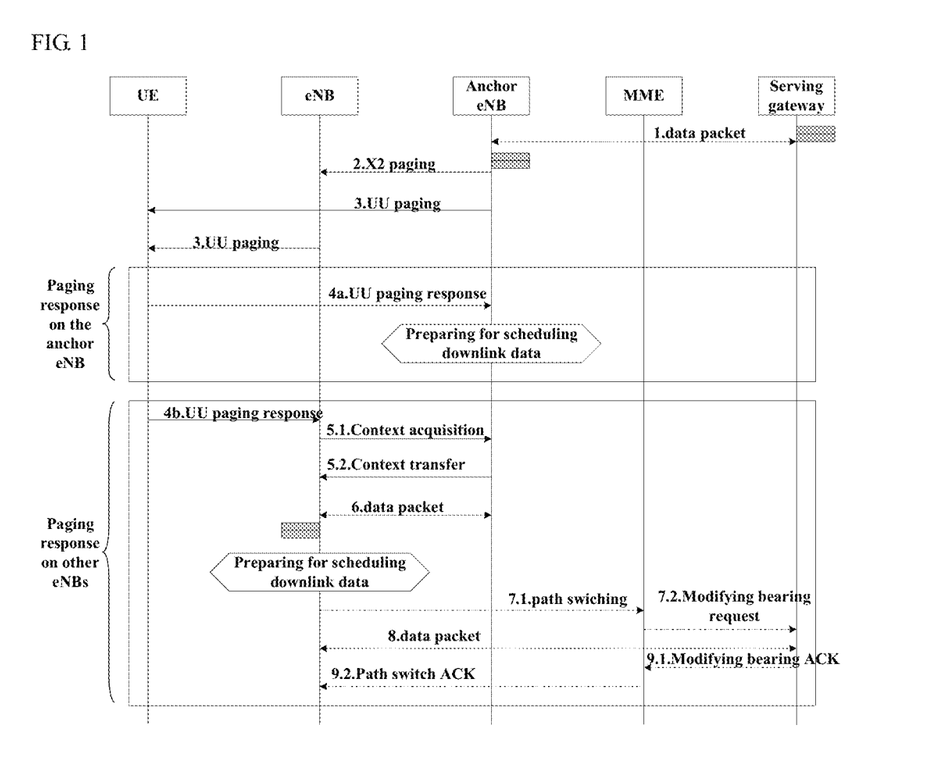
FIG. 1 is a schematic diagram of a current process of acquisition of a UE context.

FIG. 1 is a schematic diagram of a current procedure of a UE context acquisition. As shown in FIG. 1, when downlink data arrives, the anchor eNB initiates RAN-based paging and decides whether to initiate a paging on the X2 interface to another eNB. If the UE is in the coverage of the anchor eNB, it directly makes a response to the paging to the anchor eNB, and the anchor eNB performs downlink data scheduling. If the UE has moved out of the coverage of the anchor eNB, it makes a response to the paging to a currently camped eNB (referred to as a current eNB for short); and when the current eNB receives the paging response, it acquires the context of the UE from the anchor eNB. Wherein, the current eNB performs downlink data scheduling, and path switch is performed in order to establish S1 connection between the current eNB and the core network.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when the UE under a coverage of a non-anchor eNB makes a response to the paging, in order to perform data scheduling, the context of the UE needs to be acquired from the anchor eNB. The procedure of acquiring the UE context increases delay of a state transition from an idle state to a connected state for the UE, which is inconsistent with the delay requirement of 5G (5th-generation mobile telephone mobile communication standard).

Regarding the above issues, embodiments of this disclosure provide a downlink data transmission method and apparatus and a communication system.

According to a first aspect of the embodiments of this disclosure, there is provided a downlink data transmission method, applicable to an anchor eNB, the method including:
  determining a non-anchor eNB which is required to schedule downlink data of an UE, by the anchor eNB, according to paging area information of the UE when the downlink data of the UE arrives; and
  transmitting a paging message by the anchor eNB to the non-anchor eNB, the paging message including a context of the UE and a data packet of the downlink data, so that the non-anchor eNB schedules the downlink data of UE according to the context of the UE.

According to a second aspect of the embodiments of this disclosure, there is provided a downlink data transmission method, applicable to a non-anchor eNB, the method including:
  receiving, by the non-anchor eNB, a paging message transmitted by an anchor eNB, the paging message including a context of UE and a downlink data packet of the UE; and
  scheduling the downlink data of the UE by the non-anchor eNB according to the context of the UE.

According to a third aspect of the embodiments of this disclosure, there is provided a downlink data transmission apparatus, configured in an anchor eNB, the apparatus including:
  a determining unit configured to determine a non-anchor eNB which is required to schedule downlink data of an UE according to paging area information of the UE when the downlink data of the UE arrives; and
  a transmitting unit configured to transmit a paging message to the non-anchor eNB, the paging message including a context of the UE and a data packet of the downlink data, so that the non-anchor eNB schedules the downlink data of UE according to the context of the UE.

According to a fourth aspect of the embodiments of this disclosure, there is provided a downlink data transmission apparatus, configured in a non-anchor eNB, the apparatus including:

> a receiving unit configured to receive a paging message transmitted by an anchor eNB, the paging message including a context of UE and a downlink data packet of the UE; and
>
> a scheduling unit configured to schedule the downlink data of UE according to the context of the UE.

According to a fifth aspect of the embodiments of this disclosure, there is provided an eNB, including the apparatus described in the third aspect, and/or including the apparatus described in the fourth aspect.

According to a sixth aspect of the embodiments of this disclosure, there is provided a communication system, including an anchor eNB, a non-anchor eNB and UE; wherein, the anchor eNB is configured with the downlink data transmission apparatus described in the third aspect, and the non-anchor eNB is configured with the downlink data transmission apparatus described in the fourth aspect.

An advantage of the embodiments of this disclosure exists in that with the embodiments of this disclosure, when the downlink data arrive, the context of the UE is transferred in advance, which may reduce a delay needed by the UE having moved out of the coverage of the anchor eNB in switching over from an idle state to a connected state.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. Such embodiments are illustrative only, and are intended to limit this disclosure.

In this disclosure, a base station may be referred to as an access point, a broadcast transmitter, a node B, or an evolution node B (eNB), etc., and may include some or all functions thereof. A term "base station" shall be used in the text, and each base station provides communication coverage for a specific geographical region.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, a cordless telephone, and a vehicle, etc.

The embodiments of this disclosure shall be described below with reference to the accompanying drawings.

Embodiment 1

Figure 2:
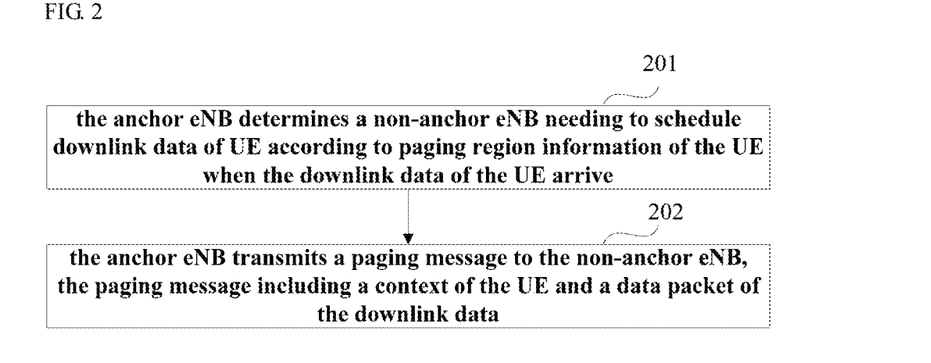
FIG. 2 is a schematic diagram of the downlink data transmission method of Embodiment 1.

This embodiment provides a downlink data transmission method, applicable to an anchor eNB. FIG. 2 is a schematic diagram of the method. As shown in FIG. 2, the method includes:

step 201: the anchor eNB determines a non-anchor eNB which is required to schedule downlink data of an UE according to paging area information of the UE when the downlink data of the UE arrives; and step 202: the anchor eNB transmits a paging message to the non-anchor eNB, the paging message including a context of the UE and a data packet of the downlink data, so that the non-anchor eNB schedules the downlink data of UE according to the context of the UE.

In this embodiment, when the downlink data arrive, the anchor eNB transmits the context of the UE to the non-anchor eNB in advance; hence, the non-anchor eNB may directly perform downlink data scheduling, thereby shortening a time for state transition from an idle state to a connected state for an UE having moved out of the coverage of the anchor eNB, and reducing control plane delay.

In step 201, the paging area information of the UE may be configured by the operators, and is semi-persistent information; however, this embodiment is not limited thereto. The anchor eNB may determine the non-anchor eNB according to the paging area information of the UE; for example, if it is determined according to the paging area information of the UE that the UE moves into coverage of a non-anchor eNB, the anchor eNB determines that the non-anchor eNB where the UE currently camps is an eNB needing to schedule the downlink data of the UE.

In step 202, the anchor eNB may transmit a paging message to the non-anchor eNB determined in step 201, such as transmitting the paging message via an X2 interface. In this embodiment, the paging message includes context information of the UE and a data packet of the downlink data, whereby the non-anchor eNB may initiate a paging procedure to the UE after receiving the paging message, and after receiving the paging response replied by the UE, schedule transmission of downlink data of the UE by using the context of the UE obtained from the paging message transmitted by the anchor eNB, thereby reducing the time needed by the UE in transferring from the idle state to the connected state.

In this embodiment, in order to make the anchor eNB known that the UE has been found and the stop the paging procedure, the non-anchor eNB may also transmit a paging response to the anchor eNB, such as transmitting a paging response via an X2 interface, then, in this embodiment, if the anchor eNB receives the paging response replied by the non-anchor eNB, the anchor eNB may stop transmitting the paging message, for example, stopping transmitting the paging message to the non-anchor eNB via the X2 interface; and for another example, stopping transmitting the paging message to the UE via a Uu interface, etc.

In one implementation of this embodiment, the paging message transmitted by the anchor eNB to the non-anchor eNB further includes indication information, such as 1-bit indication information, to indicate that the transmission of the downlink data is a small data transmission; hence, after receiving the indication information, the non-anchor eNB may determine not to perform path switch(s), that is, S1 connection between the anchor eNB and the core network is not changed, and the downlink data are transmitted to the non-anchor eNB via the anchor eNB, and then transmitted to the UE.

With the method of this embodiment, a time for state transition from an idle state to a connected state for the UE is shortened, and control plane delay is reduced.

Embodiment 2

This embodiment provides a downlink data transmission method, applicable to a non-anchor eNB. As this method is processing at the non-anchor eNB side corresponding to the method of Embodiment 1, contents identical to those in Embodiment 1 shall not be described herein any further.

Figure 3:
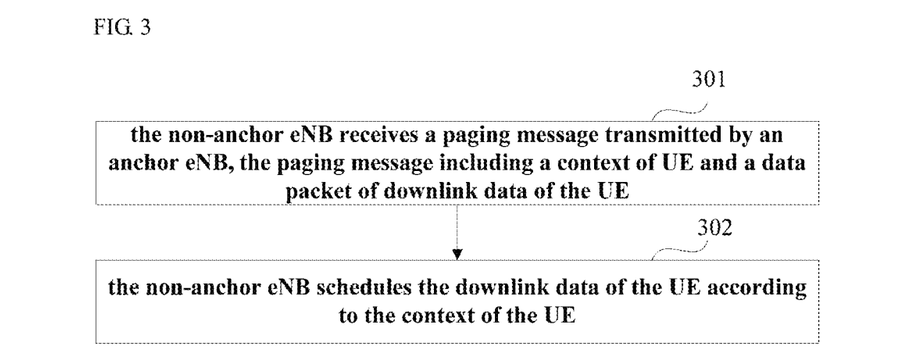
FIG. 3 is a schematic diagram of the downlink data transmission method of Embodiment 2.

FIG. 3 is a flowchart of the method of this embodiment. As shown in FIG. 3, the method includes:

step 301: the non-anchor eNB receives a paging message transmitted by an anchor eNB, the paging message including a context of an UE and a downlink data packet of the UE; and step 302: the non-anchor eNB schedules the downlink data of the UE according to the context of the UE.

In this embodiment, after receiving the paging message transmitted by the anchor eNB, the non-anchor eNB reserves the UE context and the data packet in the paging message, and initiates a paging procedure to the UE, such as transmitting the paging message to the UE via a Uu interface. After receiving the paging response replied by the UE via the Uu interface, the UE context obtained in step 301 may be used to schedule the downlink data of the UE, thereby shortening a time state transition from an idle state to a connected state for the UE, and reducing control plane delay.

In this embodiment, as described above, in order to make the anchor eNB known that the UE has been found and stop the paging procedure, the non-anchor eNB may also transmit a paging response to the anchor eNB, such as transmitting the paging response via an X2 interface, so that the anchor eNB stops the paging procedure after receiving the paging response.

In this embodiment, as described above, the paging message may further include the foregoing indication information, to indicate that the transmission of the downlink data of the UE is a small data transmission; hence, after receiving the indication information, the non-anchor eNB may determine not to perform path switch(s), that is, S1 connection between the anchor eNB and the core network is not changed, and the downlink data are transmitted to the non-anchor eNB via the anchor eNB, and then transmitted to the UE via the non-anchor eNB.

Figure 4:
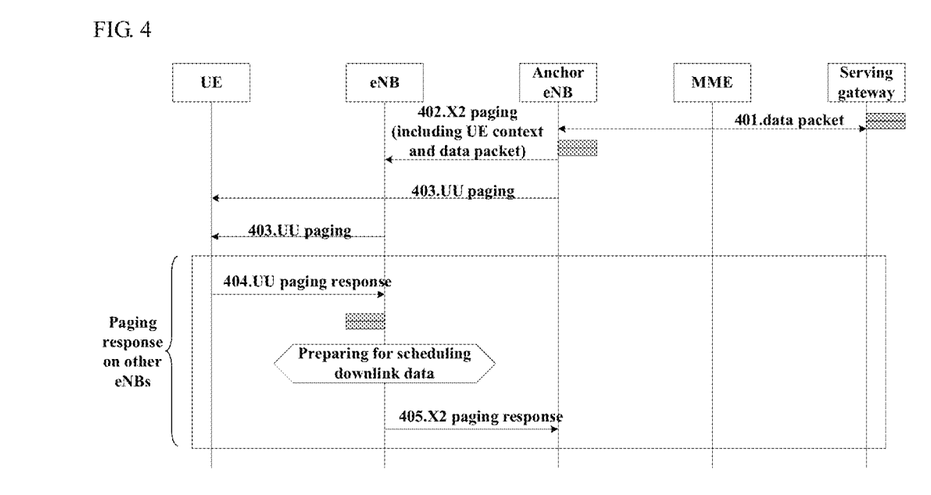
FIG. 4 is a schematic diagram of a process of information exchange between the anchor eNB and the non-anchor eNB.

FIG. 4 is a schematic diagram of an exchange procedure between the anchor eNB and the non-anchor eNB in the paging procedure of the UE. As shown in FIG. 4, the procedure includes:

step 401: the downlink data packet of the UE arrives the anchor eNB;

step 402: the anchor eNB determines a non-anchor eNB, and transmits an X2 paging message to the non-anchor eNB, the X2 paging message including the context of the UE and the downlink data packet of the UE;

step 403: the anchor eNB and the non-anchor eNB transmit Uu paging messages to the UE, respectively;

step 404: the UE replies a Uu paging response to the non-anchor eNB, and the non-anchor eNB prepares to schedule the downlink data of the UE; and step 405: the non-anchor eNB replies a X2 paging response to the anchor eNB.

With the method of this embodiment, a time for state transition from an idle state to a connected state for the UE is shortened, and control plane delay is reduced.

In this embodiment, the eNBs are differentiated by the functions of the eNBs; however, this embodiment is not limited thereto. For example, in some embodiments, the anchor eNB of this embodiment may possibly be a non-anchor eNB of other UEs, and the non-anchor eNB of this embodiment may possibly be an anchor eNB of other UEs. In a particular implementation process, whether the method of Embodiment 1 or the method of Embodiment 2 shall be used may be determined according to the functions of the eNBs.

Embodiment 3

This embodiment provides a downlink data transmission apparatus, configured in an anchor eNB. As principles of the apparatus for solving problems are similar to that of the method in Embodiment 1, the implementation of the method in Embodiment 1 may be referred to for implementation of the apparatus, with identical contents being not going to be described herein any further.

Figure 5:
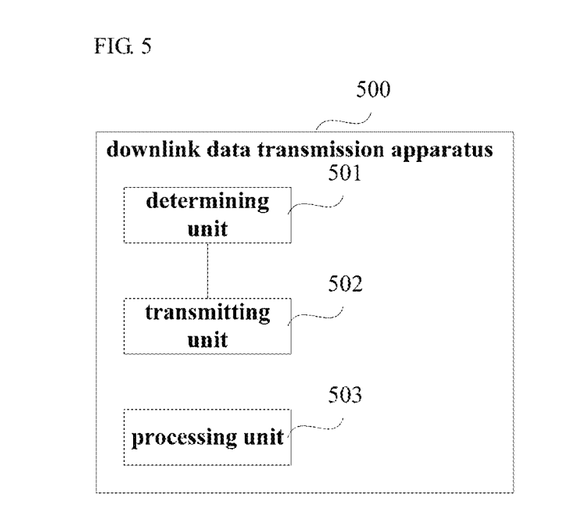
FIG. 5 is a schematic diagram of the downlink data transmission apparatus of Embodiment 3.

FIG. 5 is a schematic diagram of the downlink data transmission apparatus of this embodiment. As shown in FIG. 5, a downlink data transmission apparatus 500 includes: a determining unit 501 and a transmitting unit 502. The determining unit 501 is configured to determine a non-anchor eNB which is required to schedule downlink data of an UE according to paging area information of the UE when the downlink data of the UE arrives, and the transmitting unit 502 is configured to transmit a paging message to the non-anchor eNB, the paging message including a context of the UE and a data packet of the downlink data, so that the non-anchor eNB schedules the downlink data of the UE according to the context of the UE.

In this embodiment, as shown in FIG. 5, the apparatus 500 may further include:
   a processing unit 503 configured to stop transmitting the paging message when the anchor eNB receives a paging response replied by the non-anchor eNB.

In this embodiment, the paging message may further include indication information indicating that transmission of the downlink data is a small data transmission. Hence, the non-anchor eNB may not perform path switch(s), and S1 connection between the anchor eNB and the core network is not changed.

With the apparatus of this embodiment, a time for state transition from an idle state to a connected state for the UE is shortened, and control plane delay is reduced.

This embodiment further provides an eNB, configured with the downlink data transmission apparatus 500 as described above.

Figure 6:
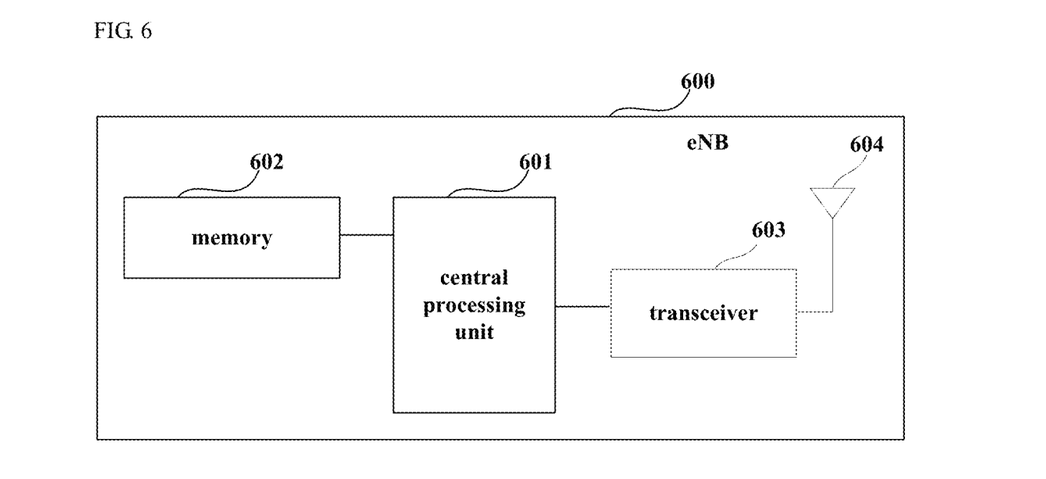
FIG. 6 is a schematic diagram of the eNB of Embodiment 3.

FIG. 6 is a schematic diagram of a structure of the eNB of the embodiment of this disclosure. As shown in FIG. 6, an eNB 600 may include a central processing unit (CPU) 601 and a memory 602, the memory 602 being coupled to the central processing unit 601. The memory 602 may store various data, and furthermore, it may store a program for information processing, and execute the program under control of the central processing unit 601, so as to receive various information transmitted by the UE, and transmit various information to the UE.

In one implementation, the functions of the downlink data transmission apparatus 500 may be integrated into the central processing unit 601. The central processing unit 601 may be configured to carry out the downlink data transmission method as described in Embodiment 1.

For example, the central processing unit 601 may be configured to: determine a non-anchor eNB which is required to schedule downlink data of an UE according to paging area information of the UE when the downlink data of the UE arrives; and transmit a paging message to the non-anchor eNB, the paging message including a context of the UE and a data packet of the downlink data, so that the non-anchor eNB schedules the downlink data of the UE according to the context of the UE.

In another implementation, the downlink data transmission apparatus 500 and the central processing unit 601 may be configured separately. For example, the downlink data transmission apparatus 500 may be configured as a chip connected to the central processing unit 601, with its functions being realized under control of the central processing unit 601.

Furthermore, as shown in FIG. 6, the eNB 600 may include a transceiver 603, and an antenna 604, etc. Functions of the above components are similar to those in the related art, and shall not be described herein any further. It should be noted that the eNB 600 does not necessarily include all the parts shown in FIG. 6, and furthermore, the eNB 600 may include parts not shown in FIG. 6, and the related art may be referred to.

With the eNB of this embodiment, a time for state transition from an idle state to a connected state for the UE is shortened, and control plane delay is reduced.

Embodiment 4

This embodiment provides a downlink data transmission apparatus, configured in a non-anchor eNB. As principles of the apparatus for solving problems are similar to that of the method in Embodiment 2, the implementation of the method in Embodiment 2 may be referred to for implementation of the apparatus, with identical contents being not going to be described herein any further.

Figure 7:
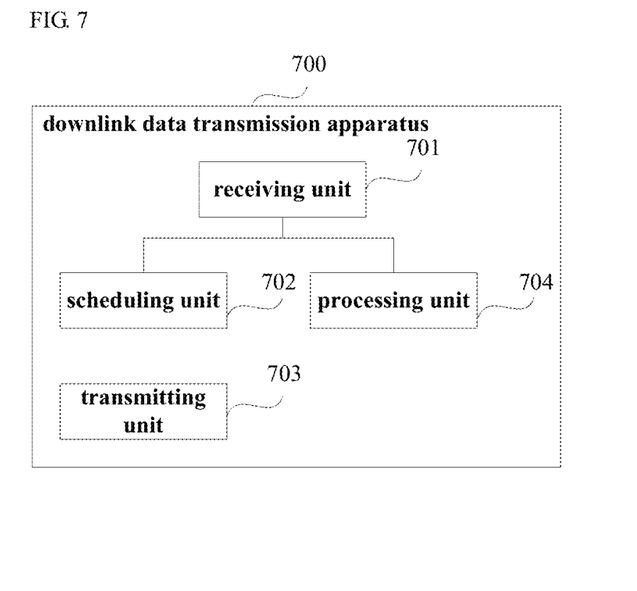
FIG. 7 is a schematic diagram of the downlink data transmission apparatus of Embodiment 4.

FIG. 7 is a schematic diagram of the downlink data transmission apparatus of this embodiment. As shown in FIG. 7, a downlink data transmission apparatus 700 includes: a receiving unit 701 and a scheduling unit 702. The receiving unit 701 is configured to receive a paging message transmitted by an anchor eNB, the paging message including a context of the UE and a downlink data packet of the UE, and the scheduling unit 702 is configured to schedule the downlink data of the UE according to the context of the UE.

In this embodiment, as shown in FIG. 7, the apparatus 700 may further include:
   a transmitting unit 703 configured to transmit a paging response to the anchor eNB.

In this embodiment, as shown in FIG. 7, the apparatus 700 may further include:
   a processing unit 704 configured to determine not to perform path switch(s) when the paging message further includes indication information indicating that transmission of the downlink data is a small data transmission. Thus there is no need to change the S1 connection between the anchor eNB and the core network.

With the apparatus of this embodiment, a time for state transition from an idle state to a connected state for the UE is shortened, and control plane delay is reduced.

This embodiment further provides an eNB, configured with the downlink data transmission apparatus 700 as described above.

Figure 8:
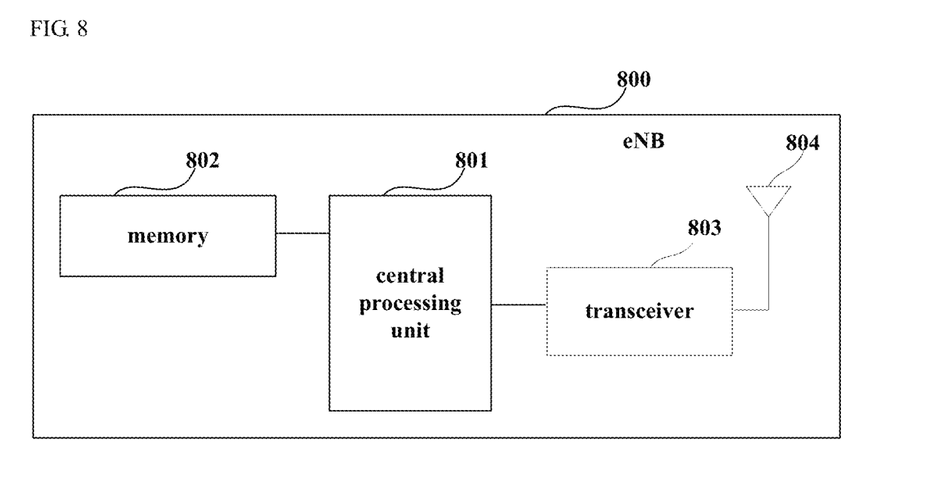
FIG. 8 is a schematic diagram of the eNB of Embodiment 4.

FIG. 8 is a schematic diagram of a structure of the eNB of the embodiment of this disclosure. As shown in FIG. 8, an eNB 800 may include a central processing unit (CPU) 801 and a memory 802, the memory 802 being coupled to the central processing unit 801. The memory 802 may store various data, and furthermore, it may store a program for information processing, and execute the program under control of the central processing unit 801, so as to receive various information transmitted by the UE, and transmit various information to the UE.

In one implementation, the functions of the downlink data transmission apparatus 700 may be integrated into the central processing unit 801. The central processing unit 801 may be configured to carry out the downlink data transmission method as described in Embodiment 2.

For example, the central processing unit 801 may be configured to: receive a paging message transmitted by an anchor eNB, the paging message including a context of an UE and a downlink data packet of the UE; and schedule the downlink data of the UE according to the context of the UE.

In another implementation, the downlink data transmission apparatus 700 and the central processing unit 801 may be configured separately. For example, the downlink data transmission apparatus 700 may be configured as a chip connected to the central processing unit 801, with its functions being realized under control of the central processing unit 801.

Furthermore, as shown in FIG. 8, the eNB 800 may include a transceiver 803, and an antenna 804, etc. Functions of the above components are similar to those in the related art, and shall not be described herein any further. It should be noted that the eNB 800 does not necessarily include all the parts shown in FIG. 8, and furthermore, the eNB 800 may include parts not shown in FIG. 8, and the related art may be referred to.

With the eNB of this embodiment, a time for state transition from an idle state to a connected state for the UE is shortened, and control plane delay is reduced.

Embodiment 5

This embodiment provides a communication system, including an anchor eNB, a non-anchor eNB and UE.

Figure 9:
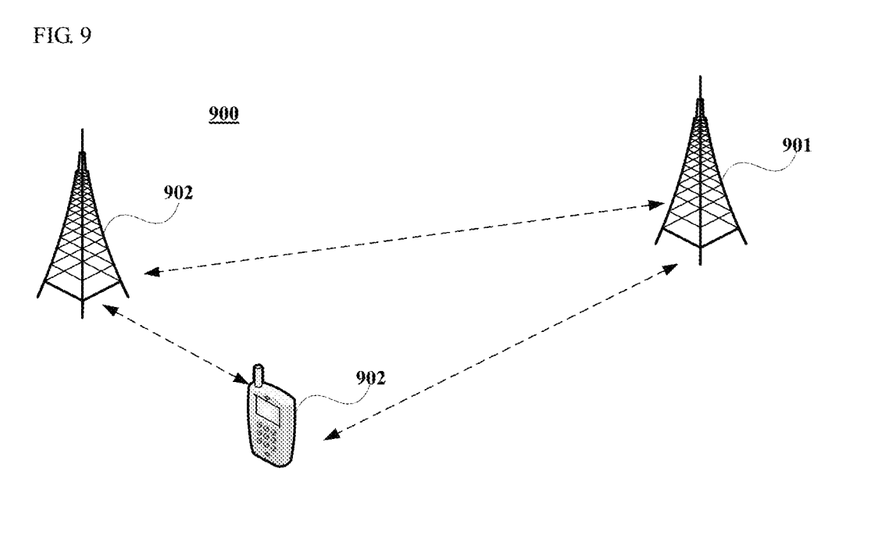
FIG. 9 is a schematic diagram of the communication system of Embodiment 5.

FIG. 9 is a schematic diagram of the communication system of the embodiment of this disclosure. As shown in FIG. 9, the communication system 900 includes an anchor eNB 901, a non-anchor eNB 902 and UE 903; wherein, the anchor eNB 901 may be the eNB 600 described in Embodiment 3, and the non-anchor eNB 902 may be the eNB 800 described in Embodiment 4.

As the anchor eNB and the non-anchor eNB have been described in the above embodiments in detail, the contents of them are incorporated herein, and shall not be described herein any further.

With the communication system of this embodiment, a time for state transition from an idle state to a connected state for the UE is shortened, and control plane delay is reduced.

An embodiment of the present disclosure provides a computer readable program code, which, when executed in a downlink data transmission apparatus or an eNB, will cause the downlink data transmission apparatus or the eNB to carry out the downlink data transmission method as described in Embodiment 1 or 2.

An embodiment of the present disclosure provides a computer storage medium, including a computer readable program, which will cause a downlink data transmission apparatus or an eNB to carry out the downlink data transmission method as described in Embodiment 1 or 2.

The above apparatuses and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The downlink data transmission methods carried out in the downlink data transmission apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 5 or 7 may either correspond to software modules of procedures of a computer program, or correspond to hardware modules. Such software modules may respectively correspond to the steps shown in FIG. 2 or 3. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 5 or 7 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 5 or 7 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A downlink data transmission apparatus, configured in a first eNB maintaining an S1 connection with a core network, the apparatus comprising:
   processor circuitry configured to
   determine a second eNB, wherein,
   the second eNB is required to schedule downlink data of a UE (user equipment) according to a paging area information of the UE and the second eNB according to information of the UE context uses indication information to determine transmission of the downlink data is a small data transmission; wherein,
   the indication information, the information of the UE context and information of the downlink data of the UE are included in a paging message transmitted to the second eNB via an interface between the first eNB and the second eNB.

2. The apparatus according to claim 1, wherein the apparatus further comprises:

processor circuitry configured to stop transmitting the paging message when the first eNB receives a paging response replied by the second eNB.

3. The apparatus according to claim 1, wherein, the indication information indicating that transmission of the downlink data is a small data transmission.

4. The apparatus according to claim 1, wherein a time for state transition from an idle state to a connected state for the UE is shortened.

5. The apparatus according to claim 1, wherein a control plane delay is reduced.

6. The apparatus according to claim 1, wherein the indication information is 1 bit.

7. A downlink data transmission apparatus, configured in a second eNB, the apparatus comprising:
a receiver configured to receive a paging message transmitted by a first eNB maintaining an S1 connection with a core network via an interface between the first eNB and the second eNB, the paging message comprising indication information, information of a UE (user equipment) context and information of downlink data of the UE; and
processor circuitry configured to schedule downlink data of a UE (user equipment) according to a paging area information of the UE and according to information of the UE context to use the indication information to determine transmission of the downlink data is a small data transmission,
a scheduler configured to schedule downlink data of the UE.

8. The apparatus according to claim 7, wherein the apparatus further comprises:
a transmitter configured to transmit a paging response to the first eNB.

9. The apparatus according to claim 7, wherein the apparatus further comprises:
processor circuitry configured to determine not to perform path switch(s) when the paging message further comprises indication information indicating that transmission of the downlink data is a small data transmission.

10. A communication system, comprising a first eNB, a second eNB and a UE (user equipment); wherein,
the first eNB maintaining an S1 connection with a core network is configured with a first downlink data transmission apparatus comprising:
processor circuitry configured to determine the second eNB, wherein,
the second eNB is required to schedule downlink data of the UE (user equipment) according to a paging area information of the UE and the second eNB according to information of the UE context uses indication information to determine transmission of the downlink data is a small data transmission; wherein, the indication information, the information of the UE context and information of the downlink data of the UE are included in a paging message transmitted to the second eNB via an interface between the first eNB and the second eNB, and,
the second eNB is configured with a second downlink data transmission apparatus comprising:
a receiver configured to receive the paging message transmitted by the first eNB;
processor circuitry configured to use the indication information to determine transmission of the downlink data is a small data transmission according to the information of the UE context; and
a scheduler configured to schedule the downlink data of the UE.

11. The communication system according to claim 10, wherein the first downlink data transmission apparatus further comprises:
processor circuitry configured to stop transmitting the paging message when the first eNB receives a paging response replied by the second eNB.

12. The communication system according to claim 10, wherein,
the indication information indicating that transmission of the downlink data is a small data transmission.

13. The communication system according to claim 10, wherein the second downlink data transmission apparatus further comprises:
a transmitter configured to transmit a paging response to the first eNB.

14. The communication system according to claim 10, wherein the second downlink data transmission apparatus further comprises:
processor circuitry configured to determine not to perform path switch(s) when the paging message further comprises indication information indicating that transmission of the downlink data is a small data transmission.

* * * * *